2,121,469

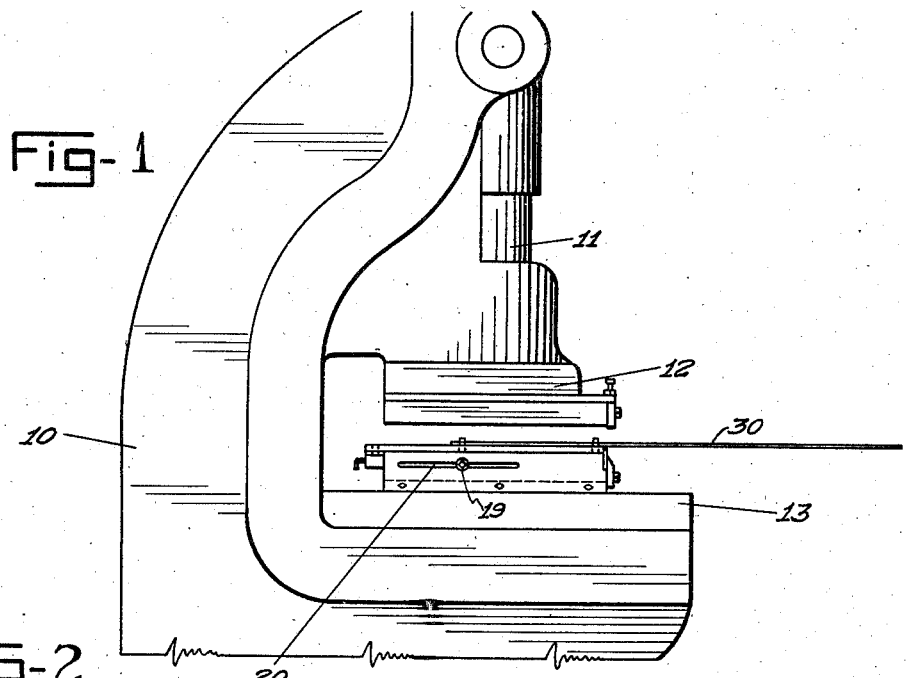
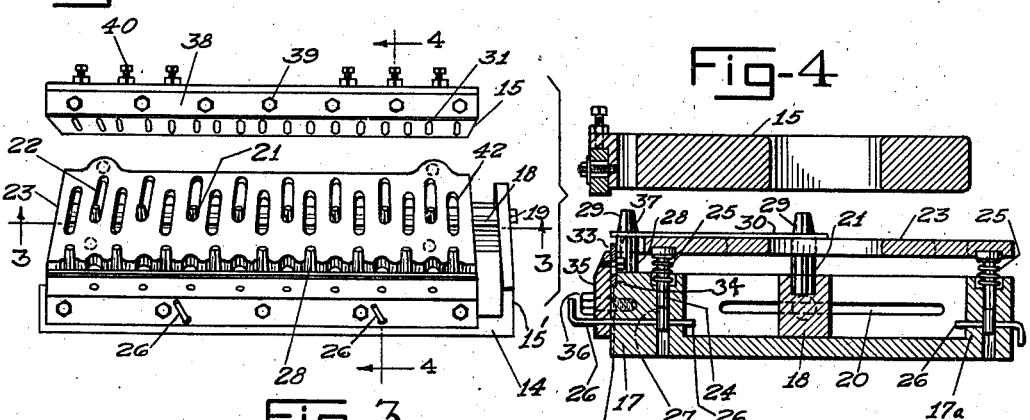
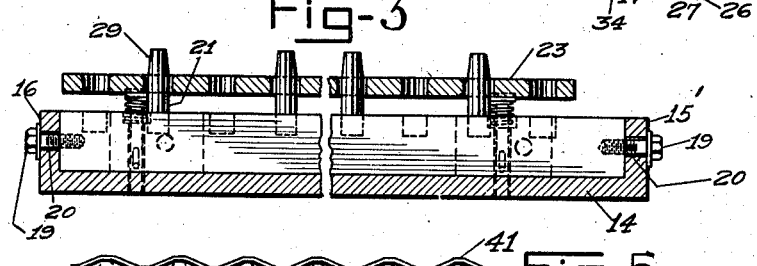
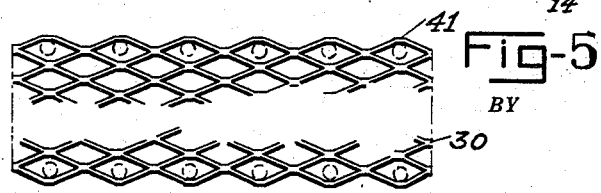
INVENTOR
MICHAEL G. VASS
BY
L. A. Paley
ATTORNEY Patented June 21, 1938

UNITED STATES PATENT OFFICE 2,121,469

SIZING AND SHEARING METHOD AND DEVICE FOR FLATTENED EXPANDED METAL

Michael G. Vass, Maywood, Ill., assignor to United States Gypsum Company, Chicago, Ill., a corporation of Illinois Application June 17, 1936, Serial No. 85,660
Renewed May 2, 1938

10 Claims. (Cl. 164—34)

This invention relates to sizing and shearing devices for flattened expanded metal, and has reference more particularly to devices of the class described for producing a sheet of flattened expanded metal of an exact size to fit a frame member of predetermined size to which it is attached.

Flattened expanded metal is commonly made by passing ordinary expanded metal through heavy rolls which serve to flatten the bonds and strands into the plane of the sheet. The flattened material is suitable for use as shelves for refrigerators, stoves, etc., such as disclosed in patent to A. C. Griffith, No. 1,961,144, when properly cut and stretched to size. The rolling and flattening operation, however, is apt to distort the diamonds of the expanded metal causing the diamonds to be out of square. Furthermore, the rolled sheet is apt to be of a width or length different than that desired. If this rolled sheet is sheared to the desired dimensions, the shear cut usually occurs at points other than through the center of the bond so that jagged points remain adjacent the shear cut, which are a menace to the hands of the workmen handling the sheared sheets.

An object of this invention, therefore, is to provide a method of simultaneously sizing and shearing sheets of flattened expanded metal, so that the finished sheets have exactly the desired dimensions and so that the shear cut extends directly through the center of the bonds leaving no jagged points adjacent the shear cut.

Another object of the invention is to provide a device suitable for carrying out the improved shearing and sizing method; also to improve flattened expanded metal manufacturing methods and devices in other respects hereinafter specified and claimed.

Reference is to be had to the accompanying drawing forming a part of this specification, in which Fig. 1 is a side elevation of a punch press equipped with my improved sizing and shearing device, Fig. 2 is a perspective view of the two sections of my device, Fig. 3 is a sectional elevation through the lower section of my device taken on line 3—3 of Fig. 2, Fig. 4 is a sectional elevation through the male and female section of the device taken on line 4—4 of Fig. 2, and Fig. 5 is a plan view of a sized and sheared sheet of flattened expanded metal made through the use of my improved method and device.

Referring to the drawing by numerals, a punch press 10 of standard design, is provided with a ram 11 having a die face 12 which reciprocates relative to a press table 13.

My sizing and shearing device comprises a male die section 14 which is securely bolted to the table 13, and a female die section 15 which is bolted to the die face 12 of ram 11 so as to reciprocate with said ram. The die section 14 is provided at each end with upstanding flanges 15' and 16, and with upstanding flanges 17 and 17a along its front and rear edges. A pin bar 18 extends between the flanges 15' and 16 and is adjustably positioned along said flanges by means of bolts 19 extending through a longitudinal slot 20 formed in each of the flanges 15 and 16. A series of equally spaced pins 21 is rigidly secured to the bar 18, said pins extending upwardly from the upper face of said bar 18 through registering slots 22 formed in a stripper plate 23. The plate 23 is yieldingly supported on a plurality of pins 24 which are mounted in the die section 14 for axial movement under the impulse of compression springs 25. The upward movement of plate 23 and pins 24 is limited by pins 26 which pass through flanges 17 and 17a and through slots 27 formed in the pins 24. A series of equally spaced pins 28 is rigidly secured to the flange 17. Each of the pins 21 and 28 is provided on its upper end with a frusto-conical tapered section 29 so that a sheet of flattened expanded metal 30 can be engaged by said tapered pin sections 29 to cause the sheet of flattened expanded metal 30 to be changed in width by stretching or compression as the case may be, as said sheet is pushed down onto said tapered pin sections 29 as the die section 15 is lowered by the downward movement of the press ram 11. Suitable slots 31 are formed in the section 15 to provide clearance for the pins 21. The sheet 30 is thus lightly held between plate 23 and die section 15 as the ram 11 is lowered, the stripper plate 23 serving to again free the sheet 30 from the pins 21 and 28 by the action of the springs 25 when the stretching or sizing operation is complete.

The flattened expanded metal is made by passing ordinary expanded metal through heavy rolls which serve to flatten the bonds and strands from an inclined position into the plane of the sheet. This rolling operation may have a tendency to distort the diamonds of the sheet 30 somewhat, so that the sheet may be slightly out of square, and so that the bonds may not be all in line. The stretching or sizing operation serves to correct these minor defects in the sheet and bring the bonds all in line so that they may be accurately sheared down their centers without leaving any jagged and dangerous points of metal which might injure workmen handling the sheets. This shearing operation can best be done at the time of the sizing operation, for the bonds all lie snugly against the tapered pins 21 which then serve as positioning pins for the shearing operation. For accomplishing the shearing of the bonds so as to separate a sheet 30 of the desired size from a sheet of indefinite length, a shear blade 33 is positioned in a suitable recess 34 in the flange 17, being held in position by a plate 35 attached to the flange 17 by tap bolts 36. Screws 37 also attach the blade 33 to the plate 35. A similar shear blade 38 is attached to the die section 15 by means of bolts 39, adjusting bolts 40 being provided to adjust the angle of shear of the blade 38. The cutting edges of blades 33 and 38 are so positioned relative to the pins 28, as to cut the bonds 41 of the flattened expanded metal exactly through their centers. When the sheet is to be narrowed in width by compression, the pins 28 are preferably made large enough at their base to exactly fit the space between bonds on the front row of diamonds, so that the pins bear against the second row of bonds during the compression, and the first row of bonds bears against the pins 28 to be cut through their centers by the knives 33 and 38. The sheet 30 is thus sheared into desired widths, and stretched or compressed to exactly the desired dimensions so as to register exactly with frame bars to which the sheet 30 is attached by welding in the manufacture of shelves for refrigerators, stoves, etc. Additional slots 42 are provided in the section 23 so that intermediate tapered pins 21 can be added to the bar 18 to handle small mesh flattened expanded metal. By loosening the bolts 19 and adjusting the position of bar 18 relative to flange 17, different widths of sheets may be produced by my device.

I would state in conclusion, that while the illustrated example constitutes a practical embodiment of my invention, I do not wish to limit myself precisely to these details, since manifestly the same can be considerably varied without departing from the spirit of the invention as defined by the appended claims.

Having thus described my invention, I claim as new and desire to secure by Letters Patent:—

1. The method of making sized sheets of flattened expanded metal, which comprises supporting said sheet while subjected to a force tending to change the original width of said sheet, and simultaneously shearing said sheet longitudinally through the center of the bonds along one edge of said sheet.

2. The method of making sized sheets of flattened expanded metal, which comprises stretching said sheet transversely to increase the original width thereof, and simultaneously shearing said sheet longitudinally through the center of the bonds along one edge of said sheet.

3. The method of shearing sheets of flattened expanded metal, which comprises supporting said sheet with a row of bonds firmly held against a series of fixed guide points, and shearing said sheet longitudinally through the center of said bonds.

4. The method of changing the width of a sheet of flattened expanded metal, which comprises forcing said sheet onto two spaced series of tapered pins, said pins being arranged to engage edge diamonds of said sheet.

5. The method of sizing and shearing a sheet of flattened expanded metal, which comprises forcing said sheet onto two spaced series of tapered pins engaging certain diamonds of said sheet so as to subject said sheet to a force tending to change the width of said sheet, and simultaneously shearing edge bonds of said sheet through the center thereof.

6. The method of sizing and shearing sheets of flattened expanded metal, which comprises advancing a strip of indefinite length of flattened expanded metal between cooperating die sections, changing the width of a predetermined area of said sheet while between said die sections, and simultaneously shearing off said sheet area through the center of the bonds of said sheet.

7. In a device for sizing sheets of flattened expanded metal, cooperating male and female die sections adapted to be engaged by a punch press, two spaced series of tapered pins on said male section adapted to engage cooperating recesses in said female section, said pins being adapted to engage spaced rows of diamonds of said sheet so as to change the width of said sheet as said diamonds are forced onto said tapered pins.

8. In a device for sizing sheets of flattened expanded metal, cooperating male and female die sections adapted to be engaged by a punch press, two spaced series of tapered pins on said male section adapted to engage cooperating recesses in said female section, said pins being adapted to engage spaced rows of diamonds of said sheet so as to change the width of said sheet as said diamonds are forced onto said tapered pins, and shear blades adjacent one row of pins adapted to shear said sheet through the center of a row of bonds adjacent one row of pins.

9. In a device for sizing and shearing sheets of flattened expanded metal, cooperating die sections adapted to receive therebetween a strip of flattened expanded metal, means associated with said die sections for changing the width of a given area of said sheet, and means associated with said die sections for shearing off said sheet area through the centers of the bonds of said sheet.

10. In a device for sizing and shearing sheets of flattened expanded metal, shear blades adapted to be actuated to shear off a predetermined area of said flattened expanded metal through the center of the bonds thereof, and means associated with said shear blades for changing the width of the sheet area sheared off.

MICHAEL G. VASS.